(No Model.)
D. W. CASWELL.
BICYCLE.
No. 603,497.
Patented May 3, 1898.
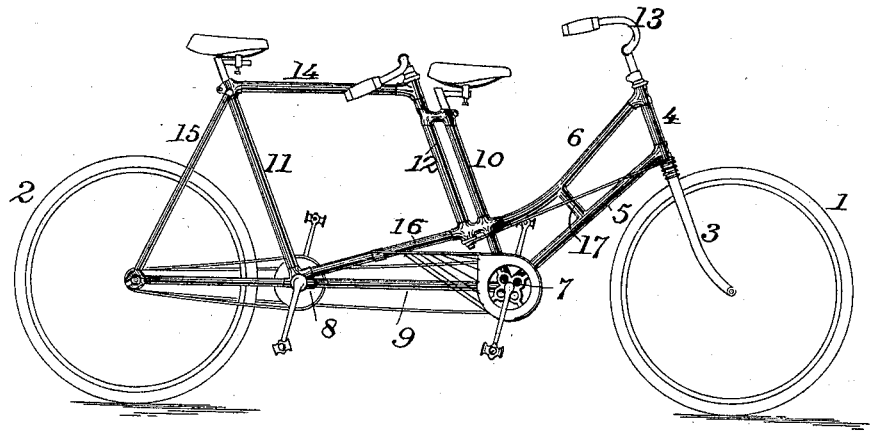

UNITED STATES PATENT OFFICE.

DANIEL W. CASWELL, OF CHICAGO, ILLINOIS, ASSIGNOR TO THE ADAMS & WESTLAKE COMPANY, OF ILLINOIS.

BICYCLE.

SPECIFICATION forming part of Letters Patent No. 603,497, dated May 3, 1898.

Application filed April 10, 1897. Serial No. 631,607. (No model.)

*To all whom it may concern:*

Be it known that I, DANIEL W. CASWELL, of Chicago, in the county of Cook and State of Illinois, have invented certain new and useful Improvements in Bicycles, of which the following is a specification, reference being had to the accompanying drawing, and to the numerals of reference marked thereon.

My invention relates more particularly to a drop-frame or combination tandem bicycle—that is to say, one in which the front portion is dropped or lowered to adapt it to the convenience of a female rider.

The object of the invention is to produce a frame for a combination tandem bicycle which shall be strong and rigid and free from weakness resulting from crushing, torsional or other strains, or from any shock or jar incident to the use of the bicycle.

Heretofore, so far as I am aware, no plan has been devised which permits of the dropping or lowering of the front portion of the frame without weakening the structure; and it is the object of my invention to prevent weakening of the frame, and yet produce a strong, rigid, and graceful construction.

The drawing is a side elevation of a combination tandem bicycle embodying my invention.

The frame as a whole, which is preferably of the approved tubular construction, is supported on the steering-wheel 1 and the driving-wheel 2. The front or steering wheel 1 is journaled in a fork 3 of any ordinary type, the upper end of the fork being of circular cross-section and passing through the tubular steering-head 4 and being provided with a handle-bar 13, all as at present well known. Running downwardly and rearwardly from the upper and lower ends of the tubular steering-head 4 are two bars 5 6, the under bar 5 being fixed at its rear end to the forward crank-hanger 7, between which and the rear crank-hanger 8 extends a bar 9, firmly secured to the two crank-hangers. Extending upwardly from the two crank-hangers are two bars 10 11, both inclining to the rear, and which support the saddles. Behind the bar 10 and rigidly secured thereto is the rear steering-head 12, connected at its top to the bar 11 by a horizontal bar 14. The two triangular frames 15, between which the rear wheel is placed, are each secured to the bar 11 and to the rear crank-hanger 8.

The bar 6 extends from the upper end of the steering-head 4 downwardly and rearwardly to the bar 10, from which point a brace 16 is in my improved frame continued rearwardly at an angle to the bar 9 as far as the crank-hanger 8, to which it is rigidly secured. The bar 6 may, as shown, be curved or straight, as desired. By this construction the weakness inherent to combination tandem bicycle-frames caused by dropping the bar 6 is overcome and a strong, rigid, and graceful form produced.

It will be seen that the weight of the riders is carried by a series of triangular frames joined together, one triangle being formed by the frames which support the rear wheels, the second triangle by the bars 5 and 6, the brace 16, and the bar 9, and the third triangle by the bar 9, the brace 16, and the lower portion of the forward seat-supporting bar 10. These three triangles are so combined and arranged that the frame is trussed against all strains to which it may be subjected. While the second triangle described is not a perfect one, it is sufficiently true to act as an efficient truss-frame. To increase the rigidity of the second triangle, a brace 17 is or may be placed between the bars 5 and 6.

Having described my invention, I claim—

In a combination tandem bicycle with its forward portion dropped, the following elements in combination: a steering-head, a front saddle-supporting bar having the forward crank-hanger at its lower end, a rear crank-hanger, an under inclined bar attached to the steering-head and to the forward crank-hanger, a horizontal bar connecting the forward and rear crank-hangers, an upper inclined bar attached to the steering-head above the under inclined bar and connecting with the front saddle-supporting bar, and a brace extending from said connection to the rear crank-hanger, substantially as set forth.

In testimony whereof I have hereunto set my hand and affixed my seal this 26th day of March, 1897.

DANIEL W. CASWELL. [L. S.]

Witnesses:
JAMES W. PATERSON,
R. F. BUNTING.